United States Patent [19]

Shiraishi et al.

[11] Patent Number: 4,617,468
[45] Date of Patent: Oct. 14, 1986

[54] STIMULABLE PHOSPHOR SHEET WITH HYDROPHILIC SURFACE

[75] Inventors: Hisashi Shiraishi, Minami-ashigara; Hisatoyo Kato; Junji Miyahara, both of Kaisei, all of Japan

[73] Assignee: Fuji Photo Film Co., Ltd., Japan

[21] Appl. No.: 582,767

[22] Filed: Feb. 23, 1984

[30] Foreign Application Priority Data

Feb. 24, 1983 [JP] Japan .................. 58-30605

[51] Int. Cl.[4] .............................................. G01T 1/10
[52] U.S. Cl. .............................. 250/484.1; 250/327.2
[58] Field of Search ................... 250/327.2, 328, 337, 250/364, 484.1, 483.1

[56] References Cited

U.S. PATENT DOCUMENTS

| 2,698,241 | 12/1954 | Saner | 430/535 |
|---|---|---|---|
| 2,764,520 | 9/1956 | Kläui | 514/529 |
| 2,864,755 | 12/1958 | Rothacker | 204/165 |
| 2,864,756 | 12/1958 | Rothacker | 204/168 |
| 2,972,534 | 2/1961 | Ben-Ezra et al. | 430/536 |
| 3,057,792 | 10/1962 | Fröhlich | 204/165 |
| 3,071,466 | 1/1963 | Klockgether et al. | 430/535 |
| 3,072,483 | 1/1963 | Trevoy et al. | 430/532 |
| 3,143,421 | 8/1964 | Nadeau et al. | 430/535 |
| 3,145,105 | 8/1964 | Lee | 430/533 |
| 3,145,242 | 8/1964 | Bryan | 264/80 |
| 3,288,995 | 11/1966 | Demorest | 250/304 |
| 3,360,448 | 12/1967 | Schneider et al. | 204/159.19 |
| 3,376,208 | 4/1968 | Wood | 204/168 |
| 3,462,335 | 8/1969 | Hansen et al. | 156/273.3 |
| 3,475,193 | 10/1969 | Takenaka et al. | 430/512 |
| 3,859,527 | 1/1975 | Luckey | 250/327.2 |
| 4,239,968 | 12/1980 | Kotera et al. | 250/327.2 |
| 4,326,078 | 4/1982 | Herrmann | 564/312 |
| 4,510,388 | 4/1985 | Yamazaki et al. | 250/327.2 |

OTHER PUBLICATIONS

N. Van Rooijen, "The Separate Detection of Two Radioactively Labelled Compounds in Tissue Sections or Cell Smears on a Lightmicroscopic Level: A Review on Double Radionuclide Autoradiography", *International Journal of Applied Radiation and Isotopes*, vol. 27, No. 10 (Oct. 1976), pp. 547–554.

Primary Examiner—Craig E. Church
Assistant Examiner—Constantine Hannaher
Attorney, Agent, or Firm—Gerald J. Ferguson, Jr.; Michael P. Hoffman; James E. Bryan

[57] ABSTRACT

A stimulable phosphor sheet preferably employable in autoradiography which comprises a substrate, a phosphor layer being provided on the substrate and comprising a stimulable phosphor dispersed in a binder, and a protective layer provided on the phosphor layer, characterized in that the surface of the protective layer is hydrophilic.

The surface of the protective layer can be made hydrophilic by hydrophilic processing applied thereto or provision of a hydrophilic layer thereon.

6 Claims, 5 Drawing Figures

STIMULABLE PHOSPHOR SHEET WITH HYDROPHILIC SURFACE

BACKGROUND OF THE INVENTION

1. Field of the Invention

The present invention relates to a stimulable phosphor sheet. More particularly, the invention relates to a stimulable phosphor sheet advantageously employable in an autoradiography utilizing a stimulable phosphor sheet.

2. Description of the Prior Arts

There has been heretofore known a radiographic process termed "autoradiography" or "radioautography" comprising steps of: introducing a radioactively labeled substance into an organism; superposing the organism or a part of tissue of the organism (that is, a sample or specimen) on a radiographic film such as a high sensitivity type X-ray film for a certain period of time to expose said film thereto; and obtaining the locational information on the radioactively labeled substance in said sample from the resolved pattern of the film. The autoradiography has been utilized, for example, to investigate the pathway and state of metabolism, absorption, and excretion of the substance introduced in the organism in detail. Such autoradiography is described, for instance, in the following literature: Method in Biochemical Experiment, Volume 6, Method in Tracer Experiment I, 271-289, "8. Autoradiography" by Toru Sueyoshi & Akiyo Shigematsu (Tokyo Kagaku Dozin Ltd., 1977).

The autoradiography has been also utilized to obtain locational information ont he radioactively labeled substances present on a medium containing radioactively labeled tissue of an organism and/or the radioactively labeled substances originating from an organism. For instance, there is known an autoradiography comprising steps of: labeling organism-originating biopolymers such as proteins or nucleic acids with a radioactive element; resolving the mixture of the radioactively labeled biopolymers, derivatives thereof, or cleavage products thereof on a gel support (medium) through a resolving process such as gel electrophoresis; placing the gel support and a high sensitivity X-ray film together in layers for a certain period of time to expose said film to the gel support, developing said film, obtaining the locational information of the radioactively labeled substances from the developed film, and then performing identification of the polymeric substances, determination of molecular weight of the polymeric substances and isolation of the polymeric substances based on the obtained locational information.

As for the autoradiography mentioed above, details are given in A. H. Gordon: ELECTROPHORESIS OF PROTEINS IN POLYACRYLAMIDE AND STARCH GELS, North-Holland Publishing Company, Amsterdam, 1969.

Recently, the autoradiography has been effectively used especially for determining the base sequence of a nucleic acid such as DNA. Therefore, the autoradiography is thought to be a very useful means in the field of structural determination of polymeric substances originating from organisms.

Maxam-Gilbert method and Sanger-Coulson method are known as methods for sequencing DNA utilizing the autoradiography. In these methods, the base sequence of DNA is determined by utilizing a characteristic structure of DNA in that DNA is in the form of a double helix structure consisting of two chain molecules stabilized through hydrogen bonding between two bases of each chain molecule, that the base, which is a part of constitutional unit of DNA, is limited to only four, namely, adenine (A), guanine (G), cytosine (C), and thymine (T), and that the hydrogen bonding between each constitutional base unit comprises only two combinations, namely, G-C and A-T.

For instance, Maxam-Gilbert method is performed by the procedure described below.

A group containing a radioactive isotope of phosphorus (P) is attached to a chain molecule of DNA or a DNA fragment at one end to be sequenced to prepare a radioactively labeled substance, and then the radioactively labeled DNA molecule is specifically cleaved at the specific constitutional unit containing a certain base by a certain chemical reaction This reaction is called a "base specific cleavage reaction". Then a mixture of numerous cleavage products of the DNA or DNA fragment, which is cleaved base-specifically by the above-mentioned procedure is resolved through gel electrophoresis to obtain a resolved pattern, in which numerous cleavage products are resolved depending on the molecular weight, which is approximately proportional to the length of molecule of the cleavage product, to form a band spectrum, or a ladder pattern (the bands are not visible) on the gel medium. The electrophoresed gel is subsequently placed in contact with a high sensitivity X-ray film for a long time at a low temperature, whereby the X-ray film is exposed to the resolved pattern, to cause the radiation from the respective bands containing the radioactively labeled cleavage products to form a latent image of the resolved pattern thereon. The X-ray film having the latent image thereon is developed to obtain a visible band spectrum consisting of a large number of bands which corresponds to the resolved pattern. Then the distance of the each band of the base-specifically cleaved product from the starting position of electrophoresis, which corresponds reversibly to the sequential position from the radioisotopically labeled terminal end of the DNA molecule, is obtained from the developed film. Thereafter, by arranging the bands of the base specific cleavage products of four bases in accordance with the distance obtained by the above-mentioned procedure, the sequential position of each base from the radioisotopically labeled end of the chain molecules is read by referring to the applied base specific chemical reaction.

Maxam-Gilbert method summarized above is described in detail in the following text: METHODS IN ENZYMOLOGY, VOL. 65, PART I (ACADEMIC PRESS, NEW YORK LONDON TORONTO SYDNEY SAN FRANCISCO, 1980)

Sanger-Coulson method also utilizes the specific structure of DNA and is employable for determining the sequence of bases in DNA by the use of DNA synthesis enzyme, gel electrophoresis, and the autoradiographic process.

The characteristics and procedures of Sanger-Coulson method as well as those of the above-mentioned Maxam-Gilbert method are briefly described in the following publicatication: "Reading the genetic information in the original language. A surprising method for sequencing the bases of DNA" written in Japanese by Kin-ichiro Miura, Modern Chemistry, September 1977, pp. 46-54 (Tokyo Kagaku Dozin Ltd., Japan).

As described above, the autoradiograhy is effectively employed for separating or identifying radioactively labeled substances originating from an organism through the steps of: resolving a mixture of the radioactively labeled substances on a support medium (e.g., support medium for electrophoresis, support medium for thin layer chromatography, etc.), and detecting one or two locational information on the resolved substances utilizing their radioactivity. This autoradiographic process is effectively employable, for instance, for determination of structure of biopolymers. For this reason, the present autoradiographic process is also utilized widely.

Nevertheless, such useful autoradiography is not free from several drawbacks in the practical use.

In the first place, a long period of time and complicated operations are involved for performing the procedure of exposing a radiographic film such as a high sensitivity X-ray film to a support medium carrying the radioactively labeled substances resolved thereon to visualize the position of the labeled substances. More in detail, in the conventional autoradiography, the above-mentioned exposing procedure is performed at a low temperature (for instance, in the vicinity of 0° C., or −70° to −90° C. for exposure in the procedure for base-sequencing of a nucleic acid) for a long period of time (for instance, several days). The reasons why these conditions are necessary are that the long exposure time is required to attain an appropriate exposure because the radioactively labeled substances subjected to autoradiography are generally not provided with high radioactivity, and that the photosensitive silver salt of the radiographic film is chemically fogged by various substances contained in the support medium when the film is kept at a relatively high temperature such as room temperature for a long period of time during the exposure, resulting in difficulty of obtaining an exposed image with high accuracy. Thus, the exposure ought to be carried out at a low temperature to suppress chemical fog. It may be proposed that a radiographic film be more sensitized to mitigate the severe exposure condition, but a radiographic film used in the conventional autoradiography is already provided with very high sensitivity, and satisfactory further enhancement in the sensitivity can not be expected, so far as the sharpness of an image to be obtained should be taken into consideration.

In the second place, the photosensitive silver salt of a radiographic film has a drawback that it is sensitive not only to the chemical irritation but also to physical inpetus, and this drawback brings about difficulty in the autoradiographic process and decreases accuracy thereof. More in detail, since the exposing proedure in necessarily carried out keeping a radiographic film in contact with the support medium, the radiographic film is generally handled with no protective cover during operations such as transferring and installing operations for the radiographic film. Accordingly, the radiographic film is likely brought into contact with hands of the operator and tools in the handling, and the physical pressure arising from these contacts causes production of the physical fog on the radiographic film. Thus produced physical fog is also a cause of the decrease of accuracy in the autoradiography. For this reason, the handling of a radiographic film requires well-trained skill and a great caution to avoid to production of the physical fog on the radiographic film, and such careful handling required brings about further complexity into the autoradiographic procedure.

In the third place, certain natural radioactive substances contained in the sample mixture in addition to the radioactively labeled substances participates in the exposure of the radiographic film because the exposure is carried out for a long time in the conventional autoradiography. Thus, the influence of the natural radioactive substances further reduces the accuracy of the locational information of the radioactively labeled substances. In order to remove the troublesome noise brought about by the natural radioactive substances, parallel experiments using control samples and a method for optimization of the exposure time have been employed, but these procedures include increased experimental runs for the parallel experiments and requires preliminary experiments to determine the preferable exposure time, and thus the drawback arising from the compicated procedures not avoidable as a whole.

The present inventors had studied for solving the above-described problems attached to the conventional autoradiography, and discovered that these problems are solved or reduced by using a stimulable phosphor sheet having a phosphor layer comrpising a stimulable phosphor dispersed in a binder as the radiosensitive material in place of the conventional radiographic film, which was applied for patent as U.S. Ser. No. 549,417 and as EP No. 83110984.8.

More in detail, the employment of a stimulable phosphor sheet having a phosphor layer comprising a stimulable phosphor dispersed in a binder as the radiosensitive material for obtaining the locational information of radioactively labeled substances resolved on a support medium in the autoradiography disclosed in the above-mentioned patent applications makes it possible not only to greatly shorten the exposure time required, but also to obtain an accurate locational information on the radioactively labeled substances even under the condition that the exposure is performed at a relatively high temperature such as an ambient temperature or a temperature in the vicinity of the ambient temperature. This fact greatly simplifies the exposing procedure adopted in the conventional autoradiography which should be carried out under chilled condition. Since the exposure time can be greatly shortened, the autoradiographic process can be carried out efficiently in a very short time as a whole. This feature is also very advantageous in the practical operations.

Further, by the employment of the stimulable phosphor sheet in the autoradiography as the radiosensitive material, neither chemical fog nor physical fog, both of which bring about serious problems in the process using the conventional radiographic film, is produced on the obtained image. This also provides advantageous feature in the improvement of accuracy and workability of the autoradiography.

Furthermore, in the case of using the stimulable phosphor sheet as the radiosensitive material, the visualization is not always required to obtain the information of the location of the copied radioactively labeled substance, that is, the locational information can be obtained in desired forms such as a visible image, symbols, numericals and combinations thereof, by scanning the phosphor sheet with an electromagnetic wave such as laser to release at least a portion of radiation energy stored in said phosphor sheet as stimulated emission, and detecting the stimulated emission to obtain locational information on the radioactively labeled substances on the support medium. It is also possible to obtain the required information in desired various forms by further processing the above-mentioned locational information using an appropriate electric means.

As described above, the autoradiography employing the stimulable phosphor sheet has various advantageous features and can be vary effectively utilized.

In the above-mentioned autoradiography, the autoradiographic process can be performed by resolving a mixture of radioactively labeled substances on an independently placed support medium (e.g., support medium for electrophoresis, or support medium for thin layer chromatography) and subsequently superposing the support medium on the stimulable phosphor sheet for performing the exposure. However, in view of the advantageous characteristics of the autoradiography using the stimulable phosphor sheet, it is preferable that the support medium is beforehand provided on the surface of the phosphor sheet and used in this composite form for resolution of the mixture. The detection of the locational information of the resolved substances can be carried out on the stimulable phosphor sheet still carrying the support medium or on the phosphor sheet from which the support medium has been removed.

The support medium can be provided on the surface of the stimulable phosphor sheet by coating an aqueous solution of a polymer or a starting material for the preparation of the polymer, the polymer being chosen from the polymers known as materials of the support medium, over the surface of the stimulable phosphor sheet, and subsequently drying or heating the coated layer. However, since the surface of the stimulable phosphor sheet is generally provided with a protective layer of hydrophobic plastic material which shows poor affinity to the aqueous solution and the material constituting the support medium, the satisfactory adhesion between the phosphor sheet and the support medium is hardly accomplished. The poor adhesion between them possibly causes separation of the support medium from the phosphor sheet. Particularly, the poor adhesion is liable to introduce voids between the surfaces of the stimulable phosphor sheet and the support medium, and accordingly the resolution on the support medium is not performed uniformly, to remarkably reduce the accuracy of the autoradiographic analysis. For these reasons, the conventional stimulable phosphor sheet is not sufficiently appropriate for use in the autoradiographic process utilizing the phosphor sheet in the form of a composite consisting essentially of the phosphor sheet and a support medium beforehand superposed thereon.

SUMMARY OF THE INVENTION

Accordingly, a principal object of the present invention is to provide a stimulable phosphor sheet advantageously employable in the autoradiographic process utilizing the phosphor sheet in the form of a composite consisting essentially of the phosphor sheet and a support medium beforehand superposed thereon.

Another object of the invention is to provide a stimulable phosphor sheet advantageously employable for accomplishing satisfactory adhesion between a stimulable phosphor sheet and a support medium in the autoradiographic process which comprises a step of superposing a support medium having a sample resolved thereon over the stimulable phosphor sheet.

A further object of the invention is to provide a stimulable phosphor sheet advantageously employable in a radiation image recording and reproducing method comprising a procedure of applying or superposing a hydrophilic material on a stimulable phosphor sheet.

There is provided by the present invention a stimulable phosphor sheet which comprises a substrate, a phosphor layer being provided on the substrate and comprising a stimulable phosphor dispersed in a binder, and a protective layer provided on the phosphor layer, characterized in that the surface of the protective layer is hydrophilic.

Typical embodiments of the stimulable phosphor sheet of the present invention include:

(1) a stimulable phosphor sheet which comprises a substrate, a phosphor layer being provided on the substrate and comprising a stimulable phosphor dispersed in a binder, and a protective layer provided on the phosphor layer, in which the surface of the protective layer has ben processed to have hydrophilic property; and (2) a stimulable phosphor sheet which comprises a substrate, a phosphor layer being provided on the substrate and comprising a stimulable phosphor dispersed in a binder, and a protective layer provided on the phosphor layer, in which a hydrophilic layer is provided on the surface of the protective layer.

DETAILED DESCRIPTION OF THE INVENTION

Figure 1:
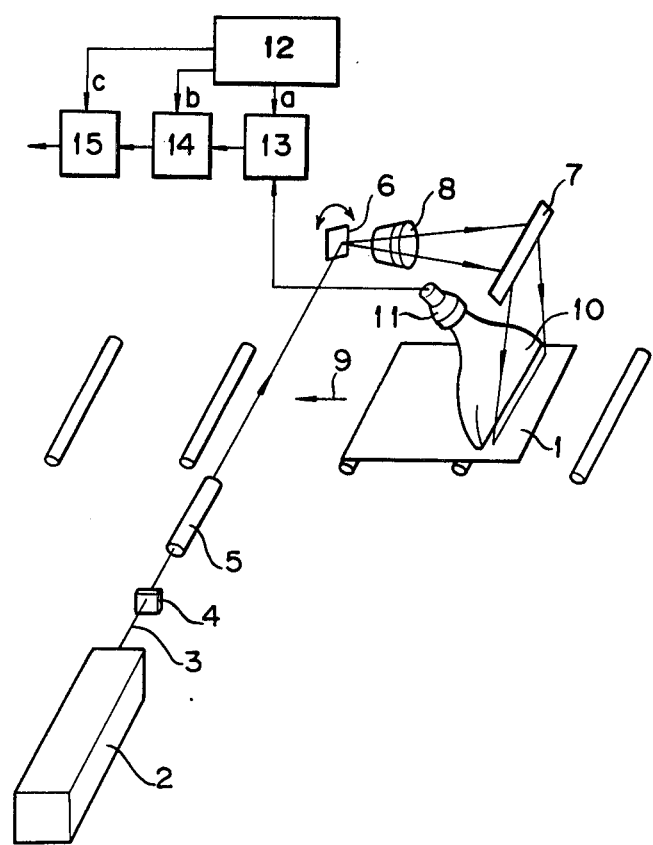
FIG. 1 shows an example of the read-out system for reading out the locational information of the radioactively labeled substances copied and stored in a stimulable phosphor sheet of the present invention.

The stimulable phosphor sheet is also referred to as a radiation image storage panel, and described, for instance, in U.S. Pat. No. 4,239,968. Accordingly, the general constitution of the stimulable phosphor sheet is already known. The stimulable phosphor sheet is used to record and reproduce the image produced by the radiation energy having passed through or having radiated from an object.

The process comprises steps of: causing the stimulable phosphor of the phosphor sheet to absorb a radiation energy having passed through an object or having radiated from an object; exciting the stimulable phosphor with an electromagnetic wave such as visible light or infrared rays (hereinafter referred to as "stimulating rays") to sequentially release the radiation energy stored in the stimulable phosphor as light emission; photoelectrically detecting the emitted light to convert it to an electric signal; and reproducing the electric signal in the form of a visible image on a recording material such as a photosensitive film or on a display device. This process is named a radiation image recording and reproducing method.

A preferable stimulable phosphor sheet of the present invention is described briefly hereinbelow.

The phosphor layer providing indispensable function to the stimulable phosphor sheet comprises a binder and a stimulable phosphor dispersed therein. When excited with an electromagnetic wave such as visible light or infrared rays after having been exposed to a radiation, the stimulable phosphor emits light (stimulated emission). Accordingly, a radiation having been radiated from a sample containing the radioactively labeled substances is absorbed by the phosphor layer of the stimulable phosphor sheet in proportion to the applied radiation dose, and a radiation image of the object is stored in the stimulable phosphor sheet in the form of a radiation energy-stored image. The stored image can be released as stimulated emission (light emission) by applying an electromagnetic wave such as visible light or infrared rays (stimulating rays) onto the stimulable phosphor sheet. The stimulated emission is then photo-electrically detected for conversion to electric signals, and thus the radiation energy-stored image can be converted to a visible image or numerical values and/or symbols which represent the locational information of the radioactive substances, namely, the radioactively labeled substances.

A material of the substrate of the stimulable phosphor sheet of the present invention can be selected from those employed in the conventional radiographic intensifying screens. Examples of the substrate material include plastic films such as films of cellulose acetate, polyester, polyethylene terephthalate, polyamide, polyimide, cellulose triacetate and polycarbonate; metal sheets such as aluminum foil and aluminum alloy foil; simple papers; baryta paper; resin-coated papers; pigment papers containing titanium dioxide or the like; and papers sized with polyvinyl alcohol or the like. From a viewpoint of characteristics of a stimulable phosphor sheet as the information recording material, a plastic film is preferably employed as the substrate material of the invention. The plastic film may contain a light-absorbing material such as carbon black, or may contain a light-reflecting material such as titanium dioxide. The former is appropriate for a high sharpness type stimulable phosphor sheet, while the latter is appropriate for a high sensitivity type stimulable phosphor sheet.

In the preparation of a known stimulable phosphor sheet, one or more additional layers are occasionally provided between the substrate and the phosphor layer, so as to enhance adhesion between the substrate and the phosphor layer, or to improve the sensitivity of the sheet or the quality of an image provided thereby. For example, a subbing layer or an adhesive layer may be provided by coating a polymer material such as gelatin over the surface of the substrate on the phosphor layer side. Otherwise, a lightreflecting layer or a light-absorbing layer may be provided by forming a polymer material layer containing a lightreflecting material such as titanium dioxide or a lightabsorbing material such as carbon black. One or more of these additional layers may be provided to the stimulable phosphor sheet of the present invention.

As described in Japanese Patent Appln. No. 57(1982)82431 (which corresponds to U.S. patent application No. 496,278 and the whole content of which is described in European Patent Publication No. 92241), the phosphor layer side surface of the substrate (or the surface of an adhesive layer, light-reflecting layer, or light-absorbing layer in the case where such layers provided on the phosphor layer) may be provided with protruded and depressed portions for enhancement of the sharpness of radiographic image, and the constitution of those protruded and depressed portions can be selected depending on the purpose of the stimulable phosphor sheet.

On the above-mentioned substrate, a phosphor layer is provided. The phosphor layer comprises basically a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–850 nm.

Examples of the stimulable phosphor employable in the stimulable phosphor sheet of the present invention include:

SrS:Ce,Sm, SrS:Eu,Sm, Th0$_2$:Er, and La$_2$0$_2$S:Eu,Sm, as described in U.S. Pat. No. 3,859,527;

ZnS:Cu,Pb, BaO.xAl$_2$O$_3$:Eu, in which x is a number satisfying the condition of $0.8 \leq x \leq 10$, and M$^{2+}$O.xSiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $0 < x+y \leq 0.6$, and $xy \neq 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

(Ba$_{1-x}$,M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in Japanese Patent Provisional Publication No. 55(1980)-12145;

M$^{II}$FX.xA:yLn, in which M$^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$, and $ThO_2$; Ln is at least one element selected from the group consisting of Eu, Tb, Ce, Tm, Dy, Pr, Ho, Nd, Yb, Er, Sm and Gd: X is at least one element selected from the group consisting of Cl, Br and I; and x and y are numbers satisfying the conditions of $5x \times 10^{-5} \leq x \leq 0.5$ and $0 < y \leq 0.2$ respectively, as described in Japanese Patent Provisional Publication No. 55(1980)-160078;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5 \leq a \leq 1.25$, $0 \leq x1$, $10^{-6} \leq y \leq 2 \times 10^{-1}$, and $0 < z \leq 10^{-2}$, respectively, as described in Japanese Patent Provisional Publication No. 56(1981)-116777;

$(Ba_{1-x},M^{II}_x)F_2 \cdot aBaX_2:yEu,zB$, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5 \leq a \leq 1.25$, $0 \leq x \leq 1$, $10^{-6} \leq y \leq 2x10^{-1}$, and $0 < z \leq 2 \times 10^{-1}$, respectively, as described in Japanese Patent Provisional Publication No. 57(1982)-23673;

$(Ba_{1-x},M^{II}_x)F_2 \cdot aBaX_2:yEu,zA$, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5 \leq a \leq 1.25$, $0 \leq x1$, $10^{-6} \leq y \leq 2 \times 10^{-1}$, and $0 < z \leq 5 \times 10^{-1}$, respectively, as described in Japanese Patent Provisional Publication No. 57(1982)-23675;

$M^{III}OX:xCe$, in which $M^{III}$ is at least one trivalent metal selected from the group consisting or Pr, Nd, Pm, Sm, Eu, Tb, Dy, Ho, Er, Tm, Yb, and Bi; X is at least one element selected from the group consisting of Cl and Br; and x is a number satisfying the condition of $0 < x < 0.1$, as described in Japanese Patent Application No. 56(1981)167498;

$Ba_{1-x}M_{x/2}L_{x/2}FX:yEu_{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2} \leq x \leq 0.5$ and $0 < y \leq 0.1$, respectively, as described in Japanese Patent Application No. 57(1982)-89875;

$BaFX \cdot xA:yEu^{+2}$, in which X is at least one halogen selected from the group consisting of Cl, Br and I; A is at least one fired product of a tetrafluoro boric acid compound; and x and y are numbers satisfying the conditions of $10^{-6} \leq x \leq 0.1$ and $0 < y \leq 0.1$, respectively, as described in Japanese Patent Application No. 57(1982)-137374;

$BaFX \cdot xA:yEu^{+2}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6} \leq x \leq 0.1$ and $0 < y \leq 0.1$, respectively, as described in Japanese Patent Application No. 57(1982)-158048;

$BaFX \cdot xNaX':aEu^{2+}$, in which each of X and X' is at least one halogen selected from the group consisting of Cl, Br and I; and x and a are numbers satisfying the conditions of $0 < x \leq 2$, $0 < x \leq 0.2$ and $0 < a \leq 0.2$, respectively, as described in Japanese Patent Application No. 57(1982)166320;

$M^{II}FX \cdot xNaX'Eu^{2+}:zA$, in which $M^{II}$ is at least one alkaline earth metal selected from the group consisting of Ba, Sr and Ca: each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0 < x2$, $0 < y \leq 0.2$ and $0 < z \leq 10^{-2}$, respectively, as described in Japanese Patent Application No. 57(1982)-166696; and $M^{II}FX \cdot aM^IX' \cdot bM'^{II}X''_2 \cdot cM^{III}X'''_3 \cdot xA:yEu^{2+}$, in which $M^{II}$ is at least one alkaline earth metal selected from the group consisting of Ba, Sr and Ca; $M^I$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Ti; A is at least one metal oxide; X is at least one halogen selected from the group consisting of Cl, Br and I; each of X', X" and X'" is at least one halogen selected from the group consisting of F, Cl, Br and I; a, b and c are numbers satisfying the conditions of $0 \leq a \leq 2$, $0 \leq b \leq 10^{-2}$, $0 \leq c \leq 10^{-2}$ and $a+b+c \geq 10^{-6}$; and x and y are numbers satisfying the conditions of $0 < x \leq 0.5$ and $0 < y \leq 0.2$, respectively, as described in Japanese Patent Application No. 57(1982)-184455.

The above-described stimulable phosphors are given by no means to restrict the stimulable phosphor employable in the present invention. Any other phosphors can be also used, provided that the phosphor gives stimulated emission when excited with stimulating rays after exposure to a radiation. A divalent europium activated alkaline earth metal fluorahalide stimulable phosphor is preferably employed.

Examples of the binder to be contained in the phosphor layer include: natural polymers such as proteins (e.g., gelatin), polysaccharides (e.g., dextran) and gum arabic; and synthetic polymers such as polyvinyl butyral, polyvinyl acetate, nitrocellulose, ethylcellulose, vinylidene chloride-vinyl chloride copolymr, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of the nitrocellulose and the linear polyester.

The phosphor layer can be formed on the substrate, for instance, by the following procedure.

In the first place, stimulable phosphor particles and a binder are added to an appropriate aolvent (for example, lower alcohol, chlorinated hydrocarbon, ketone, ester, or ether), and then they are mixed to prepare a homogeneous coating dispersion of the phosphor particles in the binder solution.

The ratio between the binder and the stimulable phosphor in the coating dispersion may be determined according to the characteristics of the aimed stimulable phosphor sheet and the nature of the phosphor employed. Generally, the ratio therebetween is within the range of from 1:1 to 1:100 (binder: phosphor, by weight), preferably from 1:8 to 1:40.

The coating dispersion may contain a dispersing agent to increase the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer includes phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of the substrate to form a layer of the coating dispersion. The coating procedure can be carried out by a conventional method such as a method using a doctor blade, a roll coater or a knife coater.

After applying the coating dispersion onto the substrate, the coating dispersion is then heated slowly to dryness so as to complete the formation of a phosphor layer. The thickness of the phosphor layer varies depending upon the characteristics of the aimed stimulable phosphor sheet, the nature of the phosphor, the ratio between the binder and the phosphor, etc. Generally, the thickness of the phosphor layer is within a range of from 20 $\mu$m to 1 mm, preferably from 50 to 500 $\mu$m.

The phosphor layer can be provided on the substrate by the methods other than that given in the above. For instance, the phosphor layer is initially prepared on a sheet (false substrate) such as a glass plate, a metal plate or a plastic sheet using the aforementioned coating dispersion and then thus prepared phosphor layer is transferred onto the genuine substrate by pressing or using an adhesive agent.

As described above, the stimulable phsophor sheet of the present invention has a protective layer on the phosphor layer. The protective layer is generally prepared from a transparent cellulose derivative such as cellulose acetate or nitrocellulose; or a transparent synthetic polymer such as polymethyl methacrylate, polyvinyl butyral, polyvinyl formal, polycarbonate, polyvinyl acetate, vinyl chloride-vinyl acetate copolymer, polyethylene terephthalate, polyethylene, polyvinylidene chloride or polyamide. The protective layer preferably has a thickness in a range of 0.1–100 $\mu$m, and more preferably in a range of 0.3–50 $\mu$m.

The surface of the protective layer of the stimulable phosphor sheet of the present invention is made hydrophilic. In the present invention, examples of the method for providing hydrophilic property to the surface of the stimulable phosphor sheet include a method of subjecting the surface of the protective layer to hydrophilic processing and a method of providing a hydrophilic layer on the surface of the protective layer.

Examples of the former method of subjecting the surface of the protective layer to hydrophilic processing include methods utilizing the following surface-activating treatements: chemical treatment using an agent such as an acid, alkali or etching solution; physical treatment such as roughing treatment; electrical treatment using corona discharge, high-frequency discharge, glow discharge or activated-plasma discharge; treatment using ultraviolet rays or laser; flame treatment; and ozone-oxidation treatment.

In the latter method of providing a hydrophilic layer on the surface of the protective layer, examples of the material employed for the hydrophilic layer include: natural polymers such as gelatin, starch, agarose, cellulose and derivative thereof; and synthetic polymer such as synthetic homopolymers (e.g. polyvinyl alcohol, polyvinyl pyrrolidone, polyacrylamide and polyhydroxyethyl methacrylate) and synthetic copolymers produced by copolymerization of hydrophilic monomers having a hydrophilic group such as a hydroxyl group or a carboxyl group and hydrophobic monomers (for example, unsatulated monomers containing ethylene such as ethylene, propylene, stylene, methacrylic acid ester, acrylic acid ester, vinyl chloride and vinylidene chloride, and dienes such as butadiene, isoprene and isobutylene).

The hydrophilic layer can be provided on the protective layer of the stimulable phosphor sheet of the present invention, for example, by the known method for forming a layer such as a method of coating the surface of the protective layer with a solution of the above-mentioned material in water or another solvent or a latex-type dispersion. The hydrophilic layer may be provided in the form of a single or plural layers.

For providing hydrophilic property to the protective layer of the stimulable phosphor sheet, there can be mentioned methods of hydrophilic processing as described in the following publications: U.S. Pat. Nos. 2,698,241, 2,764,520, 2,864,755, 2,864,756, 2,972,534, 3,057,792, 3,071,466, 3,072,483, 3,143,421, 3,145,105, 3,145,242, 3,360,448, 3,376,208, 3,462,335, and 3,475,193; and British Pat. Nos. 788,365, 804,005, and 891,469.

In the case of employing the stimulable phosphor sheet of the present invention in autoradiography, a support medium for resolving radioactively labeled organismoriginating substances thereon is preferably provided beforehand on the protective layer of the stimulable phosphor sheet to form an autoradiographic kit.

The support medium can be selected from a variety of support mediums for resolution being known or proposed for use in the conventional autoradiography. Examples of the support mediums includes support mediums for electrophoresis such as a gel support medium, a polymer sheet (e.g., cellulose acetate membrane), and filter paper, and support medium for thin layer chromatography such as silica gel.

The employable support mediums are not restricted to above-mentioned mediums. Any support medium can be utilized, so far as it can be effective for resolving (or developing) a sample thereon in autoradiography, and can be provided on the stimulable phosphor sheet of the present invention.

The support medium is preferably provided directly on the protective layer of the stimulable phosphor sheet. This can be accomplished utilizing a conventional manner that the support medium is generally formed on a support base (substrate) such as glass plate or plastic film. For example, a solution (or suspension) containing a material of the support medium which is obtained by dissolving (or dispersing) the material in an appropriate solvent is poured into a plastic frame placed on the surface of the protective layer of the stimulable phosphor sheet, or the solution is simply coated on the surface of the protective layer to form a support medium thereon. It is also possible to provide the support medium on the protective layer by independently preparing a support medium on the conventional substrate such as glass plate and plastic film and then combining the prepared support medium with the phosphor sheet. The solvent employed for dissolving the support medium material is selected from a variety of the known solvents for the support materials and pH controlled buffer solutions according to the purpose. Such solvents are well known and no further description is given in this specification.

The autoradiographic process utilizing an analytical kit comprising the stimulable phosphor sheet of the present invention and a support medium provided thereon is described below.

Examples of the sample to be resolved, namely a radioactively labeled substance originating from an organism include polymeric substances such as proteins, nucleic acids, derivatives thereof or cleavage products thereof provided with a radioactive label. The sample originating from an organism and to be analyzed by the use of the analytical kit for autoradiography is not limited to polymeric substances as mentioned above. The provision of the radioactive label to such substances can be done by a known method.

The resolving methods using the aforementioned support mediums, for instance, a method of obtaining a band spectrum of a sample on the support medium by electrophoresis are also well known, and no further description is given in this specification.

The kit for autoradiography in which a sample has been already resolved on the support medium thereof is exposed, in the first place, to light, heat or the like to release radiation energy stored in the stimulable phosphor sheet during the resolving procedure, as light emission. Generally, this procedure is necessarily performed because the stimulable phosphor sheet of the kit has been exposed to a radiation emitted by a sample (i.e., radio-actively labeled substances) moving on the support medium during the resolution, so that a radiation energy-stored image other than that of the desired resolved pattern has been already formed on the phosphor sheet to introduce a noise into the desired radiation energy-stored image to be formed in the following exposure step. Accordingly, it is preferred to erase the noise in advance of forming a radiation energy-stored image of the resolved pattern on the phosphor sheet, unless the influence of the noise is negligible. The erasing procedure can be applied to the stimulable phosphor sheet having the support medium on which the sample has been resolved, without treatment or after subjecting the support medium to drying procedure, treatment for fixing the resolved substances, etc.

Then, the exposing procedure is done by allowing the kit having the resolved sample on the support medium to stand, preferably in a dark place or a dark box for a certain period of time, so that at least a portion of a radiation emitted by the radioactively labeled substances in the sample is absorbed by the stimulable phosphor sheet to record the autoradiograph of the radioactively labeled substances resolved on the support medium as a radiation energy-stored image on the phosphor sheet.

The exposure time varies depending on the radioactivity of the radioactively labeled substance in the sample, the concentration and density of said substances, and the sensitivity of the stimulable phosphor sheet. In the case of employing the stimulable phosphor sheet as the radiosensitive material according to the present invention, however, the exposure time can be greatly reduced as compared with the exposure time required in the case of employing the conventional radiographic film. Further, a precise control of the exposure time is not required in the case of employing the stimulable phosphor sheet, because the locational information of the radioactively labeled substances on the support medium, which has been copied from the support medium and stored in the phosphor sheet through the exposing procedure, can be electrically processed in the read-out procedure depending on intensity and distribution of the stored energy and desired information.

There is no specific limitation on the temperature for carrying out the exposing procedure, but it is advantageously characteristic aspect attached to the employment of the stimulable phosphor sheet in the autoradiography, that the exposure can be performed at an ambient temperature such as a temperature within 10°–35° C. The exposure may be carried out, however, even at such low temperatures, for instance in the vicinity of 5° C. or lower as adopted in the conventional autoradiography.

The read-out procedure of the autoradiograph copied and stored in the stimulable phosphor sheet can be done in the composite form containing the support medium or after removing the support medium therefrom. The phosphor sheet without the support medium is preferably subjected to the read-out procedure. The removal of the support medium from the phosphor sheet can be easily done, for example, by stripping, scratching or washing (with water or the like) it out of the phosphor sheet.

A method for reading out the locational information of the reaioactively labeled substances of the autoradiograph copied and stored in the stimulable phosphor sheet will be described below briefly, referring to an embodiment of a read-out system shown in FIG. 1.

FIG. 1 schematically illustrates an embodiment of the read-out system for reading out the one or two dimensional information on the location of the radioactively labeled substances stored and recorded in the stimulable phosphor sheet 1 (hereinafter referred to as "phosphor sheet").

In the read-out system, the read-out operation is carried out in the following manner.

The laser beam 2 genrated by a laser source 3 passes through a filter 4 to cut off a light beam in the wavelength region corresponding to the wavelength region of stimulated emission to be emitted from the phosphor sheet 1 in response to stimulation with the laser beam 2. Then the beam diameter is precisely adjusted in a beam expander 5. Subsequently, the laser beam is deflected by a beam deflector 6 such as a galvanometer mirror, and reflected by a plane reflection mirror 7. The deflected beam then impinges one-dimensionally upon the phosphor sheet 1. Between the beam deflector 6 and the plane reflection mirror 7 and fθ lens 8 is provided so that the beam speed is continuously kept constant when the deflected laser beam is scanned on the phosphor sheet 1.

The laser source 2 used herein is so selected as to avoid overlapping of the wavelength region of the laser beam 3 with the main wavelength region of the stimulated emission to be emitted from the phosphor sheet 1.

The phosphor sheet 1 is transferred in the direction along the arrow 9 under the irradiation with the above-mentioned deflected laser beam. Accordingly, the whole surface of the phosphor sheet is subjected to the irradiation of the deflected laser beam.

When irradiated with the above-mentioned laser beam, the phosphor sheet 1 gives the stimulated emission in proportion to the radiation energy stored and recorded therein. The emission then enters into a light guiding sheet 10. The light guiding sheet 10 has a linear edge face for receiving the emission, and the edge face is so positioned in the vicinity of the phosphor sheet as to correspond to the scanning line on the phosphor sheet 1. The exit of the light guiding sheet 10 is in the form of a ring and is connected to an light-receiving face of a light detector 11 such as a photomultiplier. The light guiding sheet 10 is made, for instance, by processing a sheet of a transparent thermoplastic resin such as an acrylic synthetic resin, and so constituted that the emission introduced from the linear edge face is transmitted to the exit under repeated total reflection within the light guiding sheet 10. The stimulated emission from the phosphor sheet 1 is guided in the interior of the light guiding sheet 10 to the exit, and received by the light detector 11.

The preferable shape and material of the light guiding sheet is disclosed in Japanese Patent Provisional Publications No. 55(1980)-87970 and No. 56(1981)-11397, etc.

On the light-receiving face of the light detector 11 is provided a filter which allows only the light of wavelength region of the stimulated emission to pass through and cuts off the light of the wavelength region of the stimulating rays (laser beam) so as to detect only the stimulated emission. The stimulated emission detected by the light detector 11 is converted to an electric signal, adjusted to an appropriate level in an amplifier 13 according to an amplification degree setting value a provided by a control circuit 12 and transmitted to an A/D converter 14. The adjusted electric signal is then converted to a digital signal in the A/D converter 14 according to a scale factor setting value b provided by the control circuit 12, and supplied to a signal processing circuit 15. In the circuit 15, the digital signal is so processed according to a image processing condition setting value c provided by the control circuit 12 as to give a well readable visible image having well adjusted concentration and contrast, and then transmitted to a recording device (not shown), optionally upon storage in a storing means such as a magnetic tape.

In the control circuit 12, the amplification degree setting value a, the scale factor setting value b and the image processing condition setting value c are set, for instance, by carrying out a preliminary read-out operation prior to the above-mentioned read-out operation so that a well readable image having even concentration and contrast is obtained regardless of variation of the detected information. Otherwise, these facters can be experimentally set according to the exposure time of the stimulable phosphor sheet to the sample in the case that the content of radioactive element in the sample is previously known.

Various recording devices based on various systems can be employed for the above-described purpose, for instance, a device for visualizing optically by scanning on a photosensitive material with laser beam, etc., a display means for visualizing electrically on CRT, etc., a means for printing a radiation image displayed on CRT by means of a video printer, and a means for visualizing on heat-sensitive recording material using thermic rays.

The recording device is not restricted to the visualizing devices such as above, and the one or two dimensional information of the location of the radioactively labeled substances in a sample may be recorded or produced, for instance, in the form of numerals and/or symbols.

It is natural that other suitable methods than the above-mentioned embodiments may be used for reading out the locational information of the radioactively labeled substances copied from the sample and stored in the stimulable phosphor sheet.

In the present invention, the term "locational information" of the radioactively labeled substance(s) means to include a variety of information relating to the location of the radioactively labeled substance(s), or the aggregation thereof, such as the position and shape of the aggregation of the radioactive substances present in the support medium, the concentration and distribution of the radioactive substances in the position, and combination thereof.

In the present specification, the stimulable phosphor sheet having hydrophilic property on the surface according to the present invention has been described by referring to a stimulable phosphor sheet for autoradiograhy which carrys on the protective layer thereof a support medium for resolution of a sample containing radioactively labeled substances. However, the stimulable phosphor sheet is not restricted by such embodiment. For instance, the stimulable phosphor sheet having hydrophilic property on the surface according to the invention can be also advantageously utilized for receiving thereon an optionally selected hydrophilic layer such as a culture medium for microorganisms.

There is no specific need of beforehand providing a hydrophilic layer such as a support medium for resolution of a sample or a culture medium on the stimulable phosphor sheet of the present invention. For instance, a support medium on which resolution of a sample containing radio-actively labeled substances has been complete, or a culture medium on which a sample containing radioactively labeled substances has been cultured can be provided on the stimulable phosphor sheet of the invention for obtaining locational information of these labeled substances on the medium. Even in these cases, the stimulable phosphor sheet of the present invention can receive the medium under so close adhesion to facilitate the exposing procedure and to increase accuracy of the obtained locational information.

The autoradiography utilizing a kit containing the stimulable phosphor sheet of the present invention will be described in the following example, in which an initial stage for sequencing a certain DNA according to Maxam-Gilbert method is mentioned.

EXAMPLE 1

(1) Preparation of Kit Containing Stimulable Phosphor Sheet for Autoradiography To a mixture of a particulate europium activated barium fluorobromide stimulable phosphor (BaFBr:Eu) and a linear polyester resin were added successively methyl ethyl ketone and nitrocellulose (nitrification degree: 11.5%), to prepare a dispersion containing the phosphor particles. Subsequently, tricresyl phosphate, n-butanol and methyl ethyl ketone were added to the resulting dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing carbon black (substrate, thickness: 250 μm) placed horizontally on a glass plate. The application of the coating dispersion was carried out using a doctor blade. The substrate having a layer of the coating dispersion was then placed in an oven and heated at a temperature gradually rising from 25° to 100° C. Thus, a phosphor layer having thickness of 300 μm was formed on the substrate.

A transparent polyethylene terephthalate film (thickness: 12 μm, provided with a polyester adhesive on the undersurface) was superposed on the phosphor layer to combine them via the adhesive. Thus, a stimulable phosphor sheet consisting of a support, a phosphor layer, and a protective layer was prepared.

The surface of the protective layer was then subjected to glow discharge processing. The glow discharge processing was performed in a vacuum tank at pressure of 0.05 mmHg by moving the stimulable phosphor sheet facing the surface of the protective layer thereof to a face of a semicircular electrode plate which was composed of four bar electrodes (cross section: 2 cm, length: 40 cm) arranged at 10 cm intervals, keeping a distance of 15 cm therebetween, under such conditions as the discharge voltage of 3 kV, the processing period of 3 sec. and the electrode current of 0.4 A.

The stimulable phosphor sheet having the protective layer having been subjected to the glow discharge processing was placed on a glass plate (thickness: 4 mm) keeping the processed surface upwardly. On the surface of the protective layer was placed spacer strips of polymethyl methacrylate (thickness: 1.5 mm) to form a frame, which was then covered with a glass plate of the same thickness to form a mold (1.5 mm×200 mm×200 mm). A trisborate buffer solution containing acrylamide (acrylamide content: 8%, cross-linking agent content: 3%) prepared by the known method was poured into the mold and polymerized therein. Thus, a kit containing a slab gel of polyacrylamide was prepared.

(2) Autoradiography

Plasmid DNA of E. coli, (pBR 322) was cleaved by the use of restriction enzyme Hind-III by the known method, and 5'-end thereof was labeled with $^{32}P$ to obtain 1 μg. of a double helix DNA ($^{32}P$-labeled substance).

The double helix DNA (1 μg.) and approx. 1 unit of the restriction enzyme Hae-III were added to 20 μl. of 20 mM of tris[tris(hydroxymethyl)aminomethane]—hydrochloric acid buffer solution (pH 7.4) containing 5 mM of magnesium chloride and 1 mM of dithiothreitol. The resulting mixture was maintained at 37° C. for one hour to perform the specific cleavage reaction to obtain a cleaved mixture solution containing cleavage products.

The cleaved mixture solution was applied onto the slab gel support medium of the above-mentioned kit and electrophoresed using 50 mM tris—borate buffer solution (pH 8.3) containing 1 mM of EDTA as an electrode solution at voltage of 500 V. The electrophoresis was continued until the marker dye (Bromophenol Blue) added to the sample reached the bottom end of the gel, and the starting position of the sample was marked with a $^{32}P$-containing ink.

The kit was exposed to light to erase a noise of the stimulable phosphor sheet and then allowed to stand at room temperature (approx. 25° C.) for 1 min. in a dark box to perform the exposing procedure.

Figure 2:
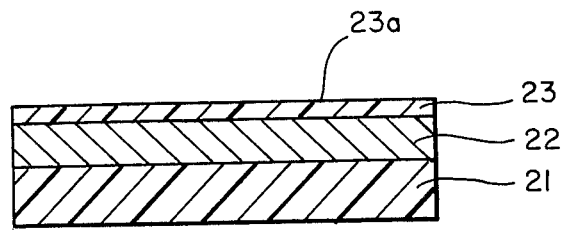
FIG. 2 illustrates a typical embodiment of the stimulable phosphor sheet of the invention, which comprises a plastic substrate 21, a phosphor layer 22, and a plastic protective layer 23 having a hydrophilically treated surface 23a thereon.
Figure 3:
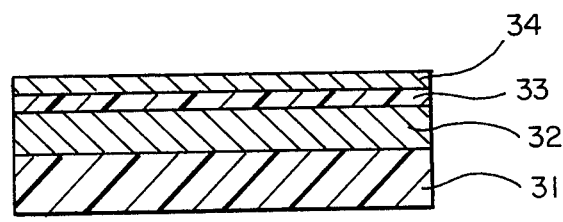
FIG. 3 illustrates another typical embodiment of the stimulable phosphor sheet of the invention, which comprises a plastic substrate 31, a phosphor layer 32, a plastic protective layer 33 and a hydrophilic layer 34.
Figure 4:
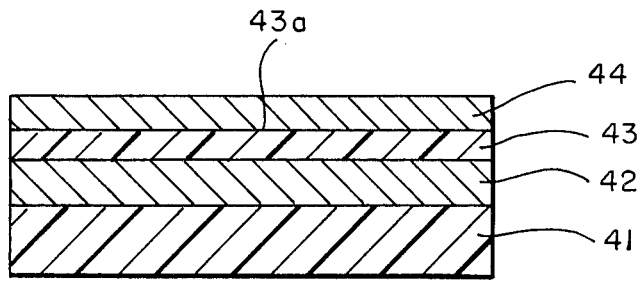
FIG. 4 illustrates an autoradiographic kit formed by the combination of the stimulable phosphor sheet of the invention with a superposed support medium, which comprises a plastic substrate 41, a phosphor layer 42, a plastic protective layer 43 having a hydrophilically treated surface 43a thereon and a hydrophilic support medium 44.
Figure 5:
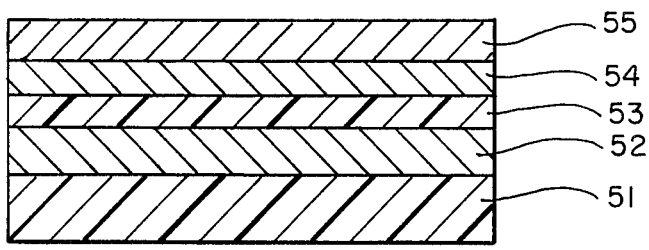
FIG. 5 illustrates a further autoradiographic kit formed by the combination of the stimulable phosphor sheet of the invention with a superposed support medium, which comprises a plastic substrate 51, a phosphor layer 52, a plastic protective layer 53, a hydrophilic layer 54 and a hydrophilic support medium 55.

The gel support medium together with the polyethylene terephthalate film was removed from the kit in a dark room to obtain only the phosphor sheet having an autoradiograph of the resolved substances copied and stored therein. The stimulable phosphor sheet was placed in a read-out device as shown in FIG. 2 to obtain the locational information indicating the electrophoresed positions of the fragments having the $^{32}P$ label, by reading out the distance from the starting position marked with the $^{32}P$-containing ink. According to thus obtained locational information, the portions containing the desired fragments provided with $^{32}P$ label were cut out of the separated slab gel with a thin razor blade, and the gel portion segment was placed in a test tube.

For confirmation, the residual gel (a part of which had been removed as above) was again laid on a stimulable phosphor sheet, and the read-out procedure was performed in the read-out device to confirm absence of the $^{32}P$-labeled fragments. The result of the examination indicated that the $^{32}P$-labeled fragments had been completely removed from the gel support medium. Thus, it was confirmed that the accuracy of the locational information of $^{32}P$-labeled fragments obtained by means of the above-mentioned stimulable phosphor sheet was sufficiently high.

We claim:

1. A stimulable phosphor sheet which comprises:
   a plastic substrate;
   a phosphor layer being provided on the substrate and comprising a stimulable phosphor dispersed in a binder; and
   a plastic protective layer provided on the phosphor layer, said protective layer having a hydrophilically-processed surface to receive superposition of a hydrophilic material thereon.

2. The combination of a stimulable phosphor sheet and a hydrophilic support medium, said combination comprising:
   a plastic substrate;
   a phosphor layer being provided on the substrate and comprising a stimulable phosphor dispersed in a binder;
   a plastic protective layer provided on the phosphor layer, said protective layer having a hydrophilically-processed surface; and
   a hydrophilic support medium carrying radioactively labeled substances resolved thereon,
   said hydrophilic support medium being superposed on said hydrophilically-processed surface 3. The stimulable phosphor sheet as claimed in claim 1 or 2, wherein the stimulable phosphor is a divalent europium activated alkaline earth metal fluorohalide phosphor.

4. A stimulable phosphor sheet which comprises:

a plastic substrate;

a phosphor layer being provided on the substrate and comprising a stimulable phosphor dispersed in a binder;

a plastic protective layer provided on the phosphor layer; and a hydrophilic layer provided on the protective layer to receive superposition of a hydrophilic material thereon.

5. The combination of a stimulable phosphor sheet and a hydrophilic support medium, said combination comprising:

a plastic substrate;

a phosphor layer being provided on the substrate and comprising a stimulable phosphor dispersed in a binder;

a plastic protective layer provided on the phosphor layer;

a hydrophilic layer provided on the protective layer; and a hydrophilic support medium carrying radioactively labeled substances resolved thereon, said hydrophilic support medium being superposed on said hydrophilic layer.

6. The stimulable phosphor sheet as claimed in claim 4 and 5, wherein the stimulable phosphor is a divalent europium activated alkaline earth metal fluorohalide phosphor.

* * * * *